United States Patent [19]

Finnegan

[11] 4,230,248
[45] Oct. 28, 1980

[54] SKI RACK

[75] Inventor: Robert J. Finnegan, Williston, Vt.

[73] Assignee: Barreca Products Co., Inc., Shelburne, Vt.

[21] Appl. No.: 20,748

[22] Filed: Mar. 15, 1979

[51] Int. Cl.³ .............................. B60R 9/04; B60P 3/00
[52] U.S. Cl. ................................ 224/323; 211/60 SK; 296/3
[58] Field of Search .................. 224/323; 211/60 SK; 296/3

[56] References Cited

U.S. PATENT DOCUMENTS

| | | | |
|---|---|---|---|
| 3,348,747 | 10/1967 | Vuarchex | 224/323 X |
| 3,836,058 | 9/1974 | Penniman et al. | 224/323 X |
| 3,897,895 | 8/1975 | Read | 224/323 |

Primary Examiner—Steven M. Pollard
Attorney, Agent, or Firm—Hopgood, Calimafde, Kalil, Blaustein & Lieberman

[57] ABSTRACT

The invention contemplates a rack construction as for carrying skis or the like on the roof or other exterior part of a vehicle. Plural pairs of skis are vertically clamped, back-to-back, by like pairs of relatively movable upstanding post members and a single lockable means carried by the rack is operative to selectively hold or to release a control member for releasing all post pairs in unison. The respective posts of each pair are capable of limited longitudinal displaceability and limited pivotal action, and the lockable actuator is operated to determine whether or not the posts of each pair are to be permitted their pivoted action.

11 Claims, 9 Drawing Figures

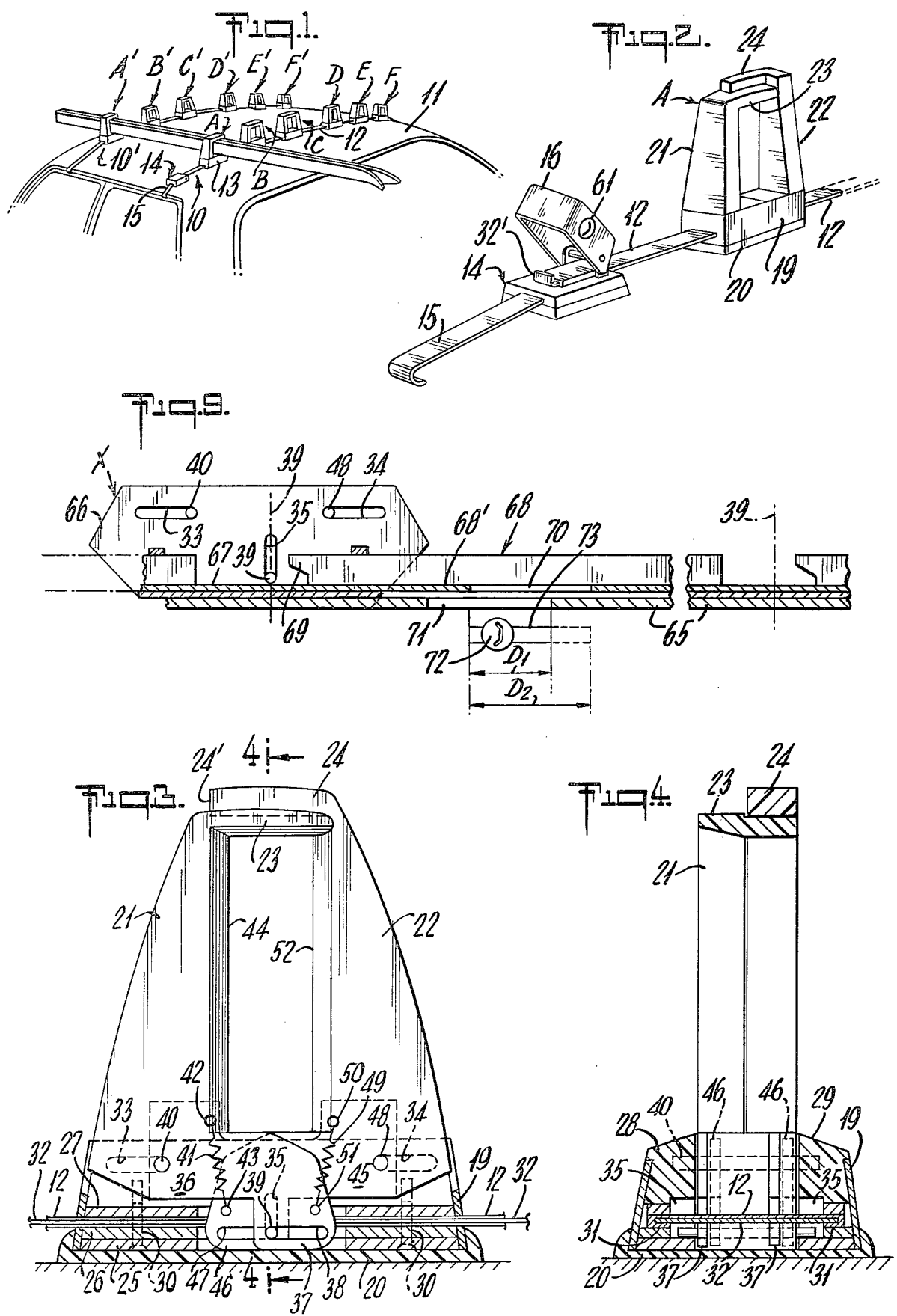

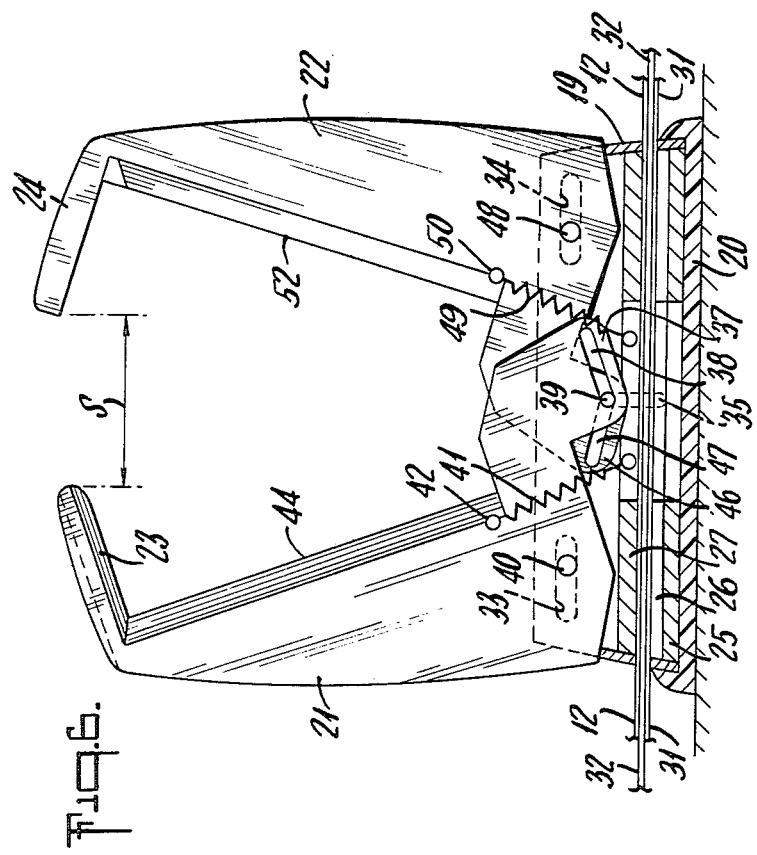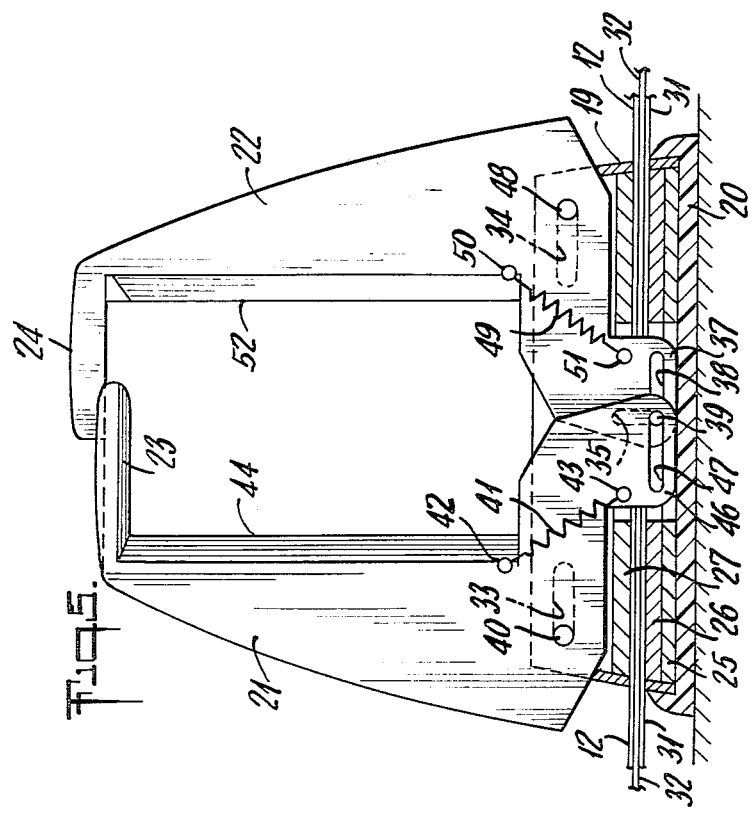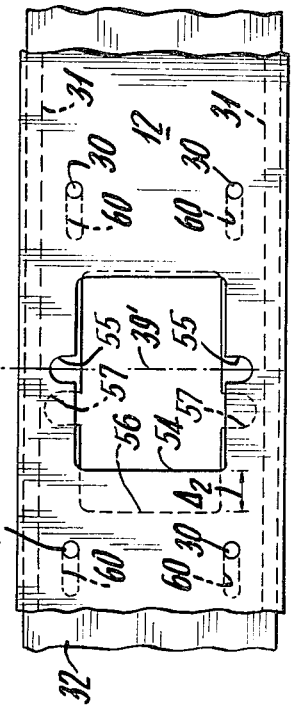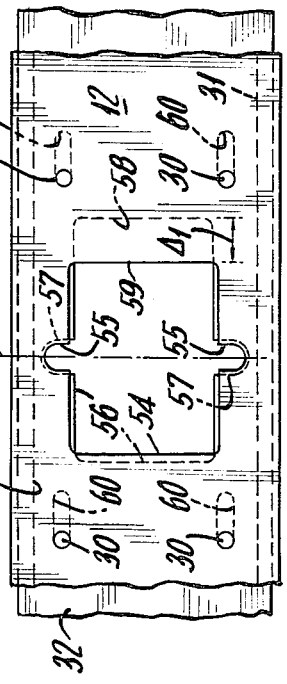

SKI RACK

BACKGROUND OF THE INVENTION

This invention relates to rack constructions for carrying skis or the like on the roof or other exterior part of a vehicle.

Several general types of ski constructions are in use today, but each is beset with disadvantages and unnecessary limitations. Generally, these disadvantages reduce to uneven clamp action, insecure clamp action, too few skis served by a single lock and key, inability to lock the clamp along the rack without using a key. One very satisfactory ski rack of the character indicated is disclosed in Penniman et al U.S. Pat. No. 3,836,058 but even this has certain disadvantages, not the least of which is relative complexity and numbers of parts.

BRIEF SUMMARY OF THE INVENTION

It is an object of the invention to provide an improved construction avoiding the disadvantages and limitations of prior constructions.

Another object is to provide an improved rack of the character indicated having greater adaptability to varying exterior body surface contours.

A further object is to provide an improved ski rack inherently lending itself with greater ease to adaptation of different selected numbers of clamp units along the length of a given rack.

A specific object is to provide such a ski rack in which individual clamp units receive direct support from the vehicle surface to which they are mounted and wherein a control operative upon all units in unison is flexibly applicable from one location along the rack.

A further specific object is to provide an improved clamp unit for a rack of the character indicated featuring selectively pivotable post elements which also have a range of longitudinally displaceable accommodation to a clamped pair of skis.

A still further object is to provide a construction of the character indicated with inherent ability to operate in the presence of ice accumulations.

A general object is to meet the foregoing objects with a construction of basic simplicity, inherent low cost, and offering maximum security against tampering and thievery.

The foregoing and other objects and features of the invention are achieved in a ski rack of the present invention which provides plural independent clamp units interconnected by a flexible ribbon or strap which also contains a longitudinally slidable control element operative upon the respective clamp units in unison.

The flexible control element has a first position determining a first control function of all of the clamp units served thereby and a second position determining a different control function at each of the clamp units served thereby. In the forms to be described, the mounting of two upstanding clamp posts at each mounting unit provides the posts with a limited range of outwardly pivoted displaceability whereby access to the clamp region of each unit is facilitated, and the function determined by the control member is to deny the pivotable action to all posts, thereby holding a clamped relationship at each unit.

DESCRIPTION OF A PREFERRED EMBODIMENT

A preferred embodiment and various modes will be described in conjunction with the accompanying drawings in which:

FIG. 1 is a perspective view of an automobile roof top installation of two ski racks, one of which is a rack according to the invention;

FIG. 2 is an enlarged fragmentary perspective view of the control actuating end of the rear-mounted one of the racks of FIG. 1;

FIG. 3 is a simplified view in side elevation of one of the clamps of the rack of FIG. 2 with a portion of base house section broken away and shown in vertical section;

FIG. 4 is a simplified view of the structure of FIG. 3 taken at the general plane of 4—4 in FIG. 3;

FIG. 5 is a view similar to FIG. 3 to illustrate coaction of the clamp parts;

FIG. 6 is a view similar to FIG. 3 to illustrate rotary displaceability of the clamp parts;

FIGS. 7 and 8 are similar simplified enlarged fragmentary views of connection and control elements in each two different relationships involved in operation of the rack of FIG. 2; and FIG. 9 is a simplified partly schematic showing of a modified control arrangement.

Referring to FIG. 1, the invention comprises an elongate rack assembly 10 being one of two such assemblies 10-10' for any given installation as to the roof 11 of an automobile. The rack assemblies 10-10' may be duplicates of each other, but in the preferred form, their similarity is in initial appearance only, as will later become more clear.

Each assembly utilizes an elongate ribbon 12 having sufficient flexibility to adapt generally to the adjacent contour of the vehicle surface to which the rack is mounted, and separate clamp units 13 are connected to the ribbon 12 at desired spacing, which is usually uniform spacing. An adaptor fitting 14 terminates one end of the ribbon 12 and includes an anchoring strap 15 for reference to a fixed edge such as the rain gutter above the window of the vehicle, and similar anchor strap provision will be understood to be at the other end of the ribbon 12 so that the ribbon 12 when installed is tensed between anchor points and securely holds all clamp units 13 against the roof top 11. The means for attachment and adjustment of anchor straps 15 with respect to element 14 or the connecting ribbon 12 form no part of the invention and will therefore not be described, but it will be understood that access to appropriate tool-engageable means for developing anchor tension in the strap 15 may be available upon raising the hinged lid 16 of unit 14.

In accordance with the invention, each of the clamp units 13 comprise like pairs of adjustably set upstanding clamp posts in such plurality as to accommodate the desired maximum number of pairs of skis. In FIG. 1, the respective pairs of posts or clamp units are generally identified A, B, . . . F for a capacity of six pairs of skis, and in the case of the rack 10', the corresponding posts or clamp units are indicated at A', B' . . . F'. A single pair of skis back-to-back is shown clamped only in the A-A' location. The clamp units on rack 10' may be duplicates of those to be described in conjunction with the rack 10; however, as appears in said patent, adjustable clamping is needed only at one of the rack locations. Therefore, the clamping units of the rack 10' may comprise merely independent bases from which an inverted U-shaped rod projects to define the opening in which to insert tail ends of each given pair of skis. The final retained position of the clamp is set only by way of the corresponding clamp location along the rack 10.

Each of the clamp units 13 of the rack 10 may be the overall appearance of the A-location unit shown in FIG. 2. As externally viewed, the unit 13 comprises an elongate, apparently generally rectangularly prismatic, base 19, with an elastomeric or other protective pad 20 for seating engagement upon the vehicle surface to which the unit is to be applied. At longitudinally spaced locations, first and second posts extend vertically upward and in their normal clamp-set position, these posts define generally parallel vertical sides of a ski-receiving opening. The post 21 is shown integrally formed at its upper end with a longitudinal offset arm 23 extending in the direction of the post 22 and coacting therewith in its normal or clamp position to substantially close the ski-accommodating opening. In the form shown, the other post member 22 extends vertically upward beyond the upper end of the post member 21 and includes an offset arm 24 having longitudinally slideable overlap with the adjacent upper surface of the offset arm 23. Also as shown, the offset arm 24 is substantially one-half the thickness of the arm 23, and the described overlap is with respect to a longitudinal shoulder formation on the upper surface of arm 23. In accordance with the invention, the arms 21-22 are adapted for limited outwardly pivoted motion and for limited longitudinally outward displacement in their adaptation to and reception of an inserted pair of skis. The detailed construction and how to achieve this end will become clear from the ensuing discussion in connection with FIGS. 3 to 6.

Referring in particular to FIGS. 3 and 4, the base member 19 of each clamp unit is seen to be generally the frustum of a longitudinally elongate rectangular pyramid containing first, second and third internal plates 25-26-27 which establish variously characterized strata within the base and which are secured to each other and to laterally opposed upper side body members 28-29 which may be duplicates of each other. The securing means is in the form shown a pattern of four bolts 30 at longitudinally and laterally spaced locations which appear in plan in the enlarged views of FIGS. 7 and 8, and the arrangement is such that the elongate connecting member 12 is longitudinally secured to the clamp unit between plates 26-27 and via the bolts 30. As bast seen in FIG. 4, the connecting member 12 is an elongate ribbon, preferably of stainless steel, and with downward and inturned side flanges 31 at its opposite margins. In the space between each side flange 31 and the rest of strip 12, a ribbon 32 is located and is longitudinally slideable for a control function to be later discussed in connection with FIGS. 7 and 8. The upper body members 28-29 are formed with corresponding pairs of relatively short longitudinally extending grooves 33-34 near the respective longitudinal ends of these body members, and a pair of opposed centrally located vertical grooves 35 is defined by appropriate registering contour formation in the plates 26-27 and, to a small extent, within the body member 28-29. For the mechanical coaction desired, the grooves 33-34-35 might just as well be slots with an external covering plate, and therefore the use of the word "slot" herein in conjunction with formations at 33-34-35 will be understood to be correctly descriptive.

The post member 21 is of generally bellcrank formation, being characterized primarily by the described upwardly extending arm 21 and offset arm 23 at its upper end, these arms 21, 23 being viewed as the primary arm of the bellcrank formation. The secondary arm of the bellcrank formation is substantially entirely contained within the mounting region, that is, by and between the base in the region between members 28-29. This secondary arm is characterized by a first and second longitudinally extending portion 36, at the end of which a downward offset 37 is formed. A longitudinal slot 38 of limited length characterizes the lower end of offset 38. This slot accommodates a transverse pin 39 which extends into engagement with the vertical guide slot 35, described as part of the inner wall formation within the base 19.

A second pin 40 is carried by post member 21 and extends transversely into constant engagement with the longitudinal slot pair 33. Thus, the slots 38-33 in conjunction with pins 39-40 at least permit the post member 21 a limited longitudinal range of displaceability, dependent upon the length of these slots. It will also be noted that the constraint attributable to pin 39 and its engagement in the vertical slots 35 is such as to enable a limited range of angular displacement about the instantaneous axis of pin 40. Generally, it may be observed that the pin 40 engaging the right-end limit of slot 33, and/or the pin 39 engaging the left-end limit of slot 38, determine the rightmost position of longitudinal displacement for the post member 21, any such displaceability being only outward (i.e., in the left direction, in the sense of FIG. 3), from the position shown in FIG. 3. To complete the description of mounting for post member 21, tension-spring means 41 connects a pin 42 on post member 21 to a lug formation 43 on the plate 27, and for the most longitudinally inward position (FIG. 3) of post member 21, it is preferred that spring connection points 42-43 be at least to a degree longitudinally offset as shown, thereby assuring a component of spring tension normally urging post member 21 longitudinally to the position shown in FIG. 3. It is also to be noted that the spring 41 provides a rotational biasing force to post member 21 in the clockwise direction with respect to the pivot axis established by pin 40, thus assuring that post member 21 will at all times be normally urged to the erect position shown, wherein the inner ski clamp face 44 thereof is substantially vertical with respect to the local horizontal extent of the connection means 12 and base 19.

In a manner similar to that already described for post member 21, the second post member 22 has corresponding but opposite limited longitudinal and rotational displaceability. Thus, the upwardly extending or vertical arm with its upper offset 24 constitutes the primary arm of a generally bell crank formation for which the secondary arm 45 extends generally longitudinally and is substantially contained within and between the body members 28-29 of the base 19, and a downwardly offset slot 46 at the end of the secondary arm 45 is characterized by a local longitudinal slot 47 corresponding to the slot 38 in the offset 37. Both slots 38-47 engage the same transverse pin 39 for the longitudinally innermost position of the respective post members 21-22, and a pivot pin 48 carried by the post member 22 may have similar limiting engagement with the opposed slots 34. Finally, a tension spring 49 connects a pin 50 on post member 22 with a lug formation 51 on plate 27, at a longitudinal offset seen in FIG. 3 to be equal and opposite to that discussed above in connection with the mounting of spring 41. Thus, the spring 49 normally urges the post member 22 to its left-most longitudinal position shown in FIG. 3, and it also provides a normal counterclockwise rotational moment urging post member 22 to the erect position shown in FIG. 3, wherein the inner ski-engaging face 52 thereof is essentially parallel to the corresponding opposed face 44 of post member 21.

FIG. 5 will be recognized for its similarity to FIG. 3 and it serves to illustrate the longitudinal displaceability of the respective post members 21-22, the same being shown for their outermost longitudinal positions, wherein pins 39-40-48 reach the other longitudinal ends of the respective longitudinal slots 38-47-33-34 by which they are constrained. The indicated outward displacement is seen to further stress each of the biasing springs 41-49, meaning that the stronger component of spring bias force exists to urge the ski clamping faces 52 toward each other. At the same time, it is noted that for the purely horizontally displaced situation represented by FIG. 5, the upper offset arms 23-24 of the respective post members 21-22 remain to a degree overlapped, so that the ski receiving opening between faces 45-52 and beneath arms 23-24 remains peripherally intact.

FIG. 6 will be recognized from FIG. 3, and serves the purpose of illustrating the extreme of rotational displacement that is available for the two post members 21-22. In the pivoted relationship of FIG. 6, the span S has been opened between the outer ends of the two offset arms 23-24, this span being available to receive insertion of one or both of the skis of a given pair. The central pin 39 is seen to have been elevated in the vertical slots 35 and to have assured that both post members 21-22 are outwardly displaced to essentially the same angular extent, the instantaneous pivot axes established by pins 40-48 being correspondingly offset from nearby ends of their constraining longitudinal slots 33-34. For the opening of span S shown in FIG. 6, the tension springs 41-49 are seen to provide strong biasing action in the post-closing direction, so that as soon as any rotational force in the opening direction is relieved, the post members 21-22 will automatically seek a parallel relation of the ski-engaging surfaces 44-52.

It is appropriate to observe at this point that, in the use of the described clamp unit of FIG. 3, and assuming that one starts from the unloaded condition represented by FIG. 3, the abutting tail ends of a pair of skis are first inserted in the opening of the mounting unit in the forward rack 10' corresponding to the mounting unit of FIG. 3. Having inserted the tail ends of the skis, say at location A', the abutting skis of the pair may be manipulated as a unit to engage the end 24' of the offset arm 24 of post member 22. Such nudging will impart rotation to post member 22 about the instantaneous axis of pin 48 and against the increasing tension of spring 49, culminating in a maximum opening with span S as shown in FIG. 6, it being understood that to achieve the span S, the central pin 39 has been operative to achieve coordinated counterclockwise rotation of the other post member 21 about its instantaneous pin axis at 40. Having produced the opening of span S, the two skis may as a unit be lowered into the space beneath arms 23-24, and as soon as these arms are cleared by the skis, the spring action at 41-49 will automatically return them in the direction of clamp closure. And, in view of the direction and point of application of spring force, it will be appreciated that torque about the pins 40-48 predominates in action over force tending to draw the post members 21-22 longitudinally towards each other. The net result is that an ultimate parallel relation is assured for the ski engaging surfaces 44-52 even though these surfaces may ultimately be at greater spacing from each other than is depicted for the unloaded condition of FIG. 3.

FIGS. 7 and 8 serve to illustrate a control function which is operative upon the described action of the clamp unit of FIG. 3. Such control function being established upon relative longitudinal displacement of members 12-32. More specifically, the upper member 12, being connected to each unit body via bolt means 30, is a fixed part of the system, but it serves as a guide and is a fixed reference for enabling longitudinal sliding displacement of the strip or ribbon 32 between side flanges 31. The views of FIGS. 7 and 8 depict, on an enlarged scale, the plan form of these two elements 12-32 at their location of coaction with the clamp unit of FIG. 3 and it will be understood that similar formations and connections are established at desired spacings from a central plane of longitudinal symmetry within the unit of FIG. 3. In FIG. 3, the central pin 39 lies in this central plane of symmetry which for convenience will be identified 39' in FIGS. 7 and 8. For the conditions shown in FIG. 7, a large generally rectangular cutout or opening 54 in the connecting member 12 provides central access for non-interfering accommodation of the inserted offset ends 37-46 of the post members 21-22, and local lateral outward recesses or pockets 55 characterize the cutout or opening 54; at the central plane of symmetry 39', the width of these recesses 55 should at least accord with the width of vertical slots 35, so as to permit vertically guided displacement of pin 39 during rotational operation of the post members 21-22. Beneath connecting member 12, the control member 32 is seen to have a cutout 56 which is also generally rectangular, and for the relation of parts shown for FIG. 7, also has limited outward recess formations 57 in register with the recesses 55 at the central plane of symmetry 39'. The point of difference between openings 54-56 resides in extended length of the opening 56, manifested at the transverse edge 58 and its longitudinal offset from the corresponding edge 59 of the opening 54. This offset is symbolized by the legend $\Delta_1$ in FIG. 7 and corresponds to the longitudinal displaceability of control member 32 with respect to connecting member 12 by reason of bolts 30 passing through similarly elongate slots 60, in control member 32. Thus for the relation of parts shown in FIG. 7, the local recesses 55-57 of the respective cutouts 54-56 are in general register with each other and with the vertical slots 35. However, if and when control member 32 is actuated to the left, with respect to the relationship shown in FIG. 7, i.e., to the extent of a displacement $\Delta_2$, equal and opposite to the offset $\Delta_1$, the local recesses 55-57 are no longer in register and the control member 32 has effectively cut off the vertical extent of the slots 35 so as to preclude any pivoted action to the post members 21-22. In FIG. 1, the outer end of the control member 32 is shown with an upturned flange 32' which is exposed for actuation upon key operation at lock 61 to enable cover 16 to be hinged upwardly from base structure of the anchoring unit 14. Thus, all clamp units A, B . . . F of the rack system 10 may be controlled so as to provide and/or deny pivoted action to their post members 21-22 merely upon finger actuation at 32', and if such actuation at 32' imparts the leftward displacement described in connection with FIG. 8, all clamp units will have been secured to any and all skis received therein. Upon thereafter closing the cover 16 of anchor unit 14, the lock 61 may be actuated to interfere with displacement of member 32' back to the FIG. 4 relationship. It will be understood in this connection that the lock 61 may be of the dead bolt variety, wherein key operation is effective to dog member 32' against displacement from its position determining the FIG. 8 relationship. It will also be understood that key operation at 61 may simultaneously lock the cover 16 in place upon the base of anchor unit 14, for denial of tampering access.

FIG. 9 somewhat schematically depicts a modified locking system in conjunction with a modified system of multiple clamp units, wherein part of the frame appears in detail for one clamp unit X of an array in fixed spacing along a rigid supporting bar 65, which may be the base of an elongate extruded channel member. The depicted clamp-unit frame shows one (66) of two laterally spaced side walls, connected by a base 67 which is secured to bar 65. The longitudinal slots 33-34 and vertical slot 35 will be recognized from previous description, as will the pins 40-48-39 coacting therewith and with the post members, not shown, but corresponding to members 21-22.

Within the channel of frame 66-67 (and all other such frames of clamp units spaced along bar 65), a control member in the form of a channel 68 is longitudinally shiftable. The upstanding side walls of channel 68 are locally cut out at passage through clamp units as at X, and are characterized by a dog formation 69 which upon leftward displacement of channel 68 will engage over and prevent upward displacement of pin 39.

To retain such a dogged-pin (39) relation, the base 68' of channel 68 has an elongate rectangular opening 70 which registers with a similar opening 71 in bar 65 when channel 68 is in the dogged-pin (39) relation. But for the free or undogged relation of FIG. 9, these openings 70-71 are in only partial register, to the extent $D_1$. In this limited region of partial register, a key-operated lock 72 with associate dead bolt 73 is in its retracted position, poised to expand to the extent $D_2$, upon key operation. It will be understood that with lock means 72-73 carried by and with channel 68, the lock 72 may be manually engaged to enable channel 68 to shift to the left, for a pin-dogging engagement, whereupon the key may be operated to propel the dead bolt 73, to hold the dogged relation. Alternatively, key operation from the FIG. 9 relation will suffice to achieve and hold channel displacement to the pin-dogging relation.

While the invention has been described in detail for the preferred embodiments shown, it will be understood that modifications may be made without departing from the claimed scope of the invention.

What is claimed is:

1. In a ski rack of the character indicated, comprising a frame with an elongate base and transversely spaced upstanding side walls connected by said base, a first post member mounted to said frame and extending generally perpendicularly above said frame, said post member including a vertical portion and an upper longitudinaly offset arm extending generally parallel to said base to define a ski-locating profile for a pair of edge-mounted skis with the combined width of said pair contained beneath said arm, and a second post member having a mounting portion mounted to said frame and between said walls at a mounting region longitudinally offset from said first post member, said second post member including a vertical portion extending generally perpendicularly to effectively close the ski-accommodating space beneath said arm, the improvement in which the mounting of at least one of said post members includes first and second longitudinally spaced transverse pins extending between said side walls and through first and second longitudinally spaced portions of the mounting region of said one post member, horizontally extending slot means in at least one of said mounting regions for establishing a pin-limited range of longitudinal displacement for said one post member, and generally vertically extending slot means accommodating one of said pins in the other of said mounting regions, whereby said one post member has both a limited range of longitudinal displaceability and a limited range of angular displaceability about the instantaneous axis of said other pin.

2. The ski-rack improvement of claim 1, in which said generally vertically extending slot means terminates at a location limiting angular displaceability with the vertical portion of said one post member oriented generally parallel to the vertical portion of the other post member, said generally vertically extending slot means extending in the direction of angular displaceability of said one post member away from said other post member.

3. The ski-rack improvement of claim 2, including spring means coacting between said one post member and said frame and normally urging said post member longitudinally in the direction of said other post member and angularly in the direction of orienting the vertical portion of said one post member generally parallel to the vertical portion of the other post member.

4. The ski-rack improvement of claim 3, in which the upper end of said one post member projects beyond the upper end of the other of said post members, whereby a nudging of said one post member at the upper projecting end thereof is sufficient to develop an opening between said post members for ski insertion and whereby once thus inserted, said spring means is operative to conform the position and orientation of said one post member to the adjacent side of an inserted ski.

5. The ski-rack improvement of claim 1, in which said frame includes a longitudinally extending guide, slide means movable longitudinally in said guide and having means operative at a first longitudinal position to dog said one post member against angular displaceability, said slide being movable to a second position wherein said one post member is angularly displaceable.

6. The ski-rack improvement of claim 5, in which key operated locking means coacting between said slide and guide is operative to selectively dog said slide against longitudinal movement when in said first position.

7. The ski-rack improvement of claim 1, in which said other post member is also mounted for longitudinal and angular displacement with respect to said frame, the respective directions of angular displaceability of said post members being away from an abutment-limited position in which the vertical portions of said post members are substantially parallel.

8. The ski-rack improvement of claim 7, in which first spring means coacts between said one post member and said frame and second spring means coacts between said other post member and said frame, the respective directions of spring action being to normally urge said post members to said generally parallel orientation and in their respective direction of longitudinal approach.

9. A ski-rack clamp unit of the character indicated, comprising a frame with an elongate base and transversely spaced upstanding side walls connected by said base, first and second post members mounted to said frame between said side walls and including vertical portions extending generally perpendicularly above said frame, one of said post members including an upper longitudinally offset arm extending generally parallel to said base to define with said vertical portions a ski-locating profile for a pair of edge-mounted skis with the combined width of said pair contained beneath said arm and between said vertical portions, said post members having a mounting portion mounted to said frame between said side walls at mounting regions longitudinally offset from each other, the mounting of each of said post members including first longitudinally spaced transverse pins extending between said side walls and through corresponding portions of the mounting regions of said post members, portions of the mounting regions of both post members extending into longitudinal overlap with each other, a longitudinally central pin extending between said side walls and the overlapped regions of said post members, horizontally extending slot means in each of said post members and accommodating said central pin, horizontally extending slot means in at least one of said mounting regions for accommodation of the remaining pins between said side walls whereby both said post members have a pin limited range of longitudinal displaceability, generally vertically extending slot means accommodating said central pin for a range of vertical displaceability within and with respect to said side walls, whereby both of said post members may be angularly displaced in opposite directions for opening and closing said clamp unit for accommodation of an inserted pair of skis.

10. In a ski-rack of the character indicated, a plurality of individual ski-clamp units, each unit comprising base structure adapted to seat upon a vehicle-body exterior surface, two clamp arms extending upwardly from each unit, at least one of the upstanding arms of each unit being moveable to open and close a ski-receiving space between said arms of each unit, elongate connection means to which said units are connected in spaced relation, said connection means having bending flexibility sufficient to enable an array of said units assembled thereto to achieve independent seating engagement with the vehicle surface and with accommodation to the contour of said surface, and elongate flexible control means guided by said connection means and having a control-function relationship with the movable arm of each of said units.

11. The ski-rack of claim 10, in which said elongate connection means comprises a metal ribbon with downwardly and inwardly turned flanges at its lateral margins, said flexible control means comprising an elongate ribbon guided by and between said flanges and the underside of said connection means, and means coacting between each slotted region of said connection means and an adjacent region of said control means for determining a selected control function of the movable arm of each unit.

* * * * *